(12) United States Patent
Zhang et al.

(10) Patent No.: US 10,313,596 B2
(45) Date of Patent: Jun. 4, 2019

(54) METHOD AND APPARATUS FOR CORRECTING TILT OF SUBJECT OCUURED IN PHOTOGRAPHING, MOBILE TERMINAL, AND STORAGE MEDIUM

(71) Applicant: ZTE CORPORATION, Shenzhen, Guangdong (CN)

(72) Inventors: Yu Zhang, Guangdong (CN); Jie Zhou, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 41 days.

(21) Appl. No.: 15/538,502

(22) PCT Filed: May 21, 2015

(86) PCT No.: PCT/CN2015/079509
§ 371 (c)(1),
(2) Date: Jun. 21, 2017

(87) PCT Pub. No.: WO2016/101524
PCT Pub. Date: Jun. 30, 2016

(65) Prior Publication Data
US 2017/0352132 A1 Dec. 7, 2017

(30) Foreign Application Priority Data
Dec. 22, 2014 (CN) .......................... 2014 1 0804665

(51) Int. Cl.
G06K 9/36 (2006.01)
G06T 3/60 (2006.01)
(Continued)

(52) U.S. Cl.
CPC ......... H04N 5/232935 (2018.08); G06T 3/60 (2013.01); G06T 5/006 (2013.01);
(Continued)

(58) Field of Classification Search
None
See application file for complete search history.

(56) References Cited

U.S. PATENT DOCUMENTS 8,000,514 B2 * 8/2011 Nepomniachtchi ...... G06K 9/36
235/379
8,837,833 B1 * 9/2014 Wang ................... G06K 9/3283
382/182
(Continued)

FOREIGN PATENT DOCUMENTS

CN 101287066 A 10/2008
CN 101482924 A 7/2009
(Continued)

OTHER PUBLICATIONS

International Search Report dated Oct. 9, 2015 for International Application No. PCT/CN2015/079509, 4 pages.

Primary Examiner — Kim Y Vu
Assistant Examiner — Nathan J Bloom
(74) Attorney, Agent, or Firm — Knobbe, Martens, Olson & Bear, LLP

(57) ABSTRACT

A method and an apparatus for correcting a tilt of a subject occurred in photographing, as well as a mobile terminal and a computer storage medium are provided. In some embodiments, the method includes: after it is detected by a mobile terminal that the subject enters a viewfinder interface, identifying a boundary of a profile of the subject to obtain the profile of the subject; analyzing the profile of the subject to determine whether the subject is tilted; and performing a process for straightening and photographing on the subject to obtain a picture in which the subject is straightened if the subject is determined to be tilted.

13 Claims, 3 Drawing Sheets

(51) Int. Cl.
   *G06T 5/00*    (2006.01)
   *G06T 7/194*   (2017.01)
   *H04N 5/232*   (2006.01)
   *H04N 5/262*   (2006.01)

(52) U.S. Cl.
   CPC ......... *G06T 7/194* (2017.01); *H04N 5/23229* (2013.01); *H04N 5/23293* (2013.01); *H04N 5/23296* (2013.01); *H04N 5/2621* (2013.01); *H04N 5/2628* (2013.01); *G06K 2009/363* (2013.01); *G06T 2207/10024* (2013.01); *H04N 5/23212* (2013.01); *H04N 2201/0084* (2013.01)

(56) References Cited

U.S. PATENT DOCUMENTS

| | | | |
|---|---|---|---|
| 2001/0053292 A1* | 12/2001 | Nakamura | G06F 17/30247 396/661 |
| 2006/0164526 A1* | 7/2006 | Suzuki | G06T 3/00 348/239 |
| 2008/0266426 A1 | 10/2008 | Zeng | |
| 2009/0091531 A1* | 4/2009 | Hama | G06K 9/00 345/157 |
| 2011/0069234 A1* | 3/2011 | Kaise | H04N 5/44513 348/607 |
| 2013/0027757 A1* | 1/2013 | Lee | H04N 1/387 358/450 |
| 2014/0072201 A1* | 3/2014 | Tilt | H04N 5/23293 382/140 |
| 2014/0314336 A1* | 10/2014 | Yagi | G06T 3/0062 382/282 |
| 2017/0094158 A1* | 3/2017 | Van Olst | H04N 5/23219 |
| 2017/0270508 A1* | 9/2017 | Roach | G06Q 20/042 |
| 2017/0318235 A1* | 11/2017 | Schneider | G02B 27/2228 |

FOREIGN PATENT DOCUMENTS

| | | |
|---|---|---|
| CN | 101625760 A | 1/2010 |
| CN | 101662581 A | 3/2010 |

\* cited by examiner

METHOD AND APPARATUS FOR CORRECTING TILT OF SUBJECT OCUURED IN PHOTOGRAPHING, MOBILE TERMINAL, AND STORAGE MEDIUM

CROSS REFERENCE TO RELATED APPLICATIONS

This application is the U.S. National Phase Application under 35 U.S.C. § 371 of International Application No. PCT/CN2015/079509, filed May 21, 2015, designating the U.S. and published as WO 2016/101524 A1 on Jun. 30, 2016, which claims the benefit of Chinese Patent Application No. 201410804665.8, filed Dec. 22, 2014, which are hereby incorporated by reference in their entirety.

TECHNICAL FIELD

The present disclosure relates to the field of a mobile terminal, and more particularly to a method and an apparatus for correcting a tilt of a subject due to a photographing angle when a picture is taken by a mobile terminal, as well as a mobile terminal and a computer storage medium.

BACKGROUND

When a mobile phone is used by a user to photograph planar rectangular objects such as calligraphy and painting works, posters and documents, since a camera is usually failed to be placed on a vertical line at a central point of the object, which is perpendicular to a plane of the object, the rectangular object is presented as a trapezoidal object on a screen due to a perspective relation after being photographed. As a result, the display effect is seriously affected and the user experience is poor.

No function for correcting a tilt of a plane of a subject due to the photographing angle is found in a camera application of a current terminal product such as a mobile phone. Generally, the following two solutions are adopted by the user to prevent the plane of the subject from being tilted:

(1) enabling the camera of the mobile phone to be placed on the vertical line at the center point of the object, which is perpendicular to the plane of the object, as far as possible. However, if the area of the subject is too large or the subject is placed on the ground, such solution is hard to be achieved, or the user's feet might be shot during high angle shot.

(2) importing captured pictures into a computer or a mobile phone library and opening the pictures by the user, and then, through a mapping software or mobile phone picture editing software in the computer, selecting and stretching corner points of the picture so as to change the object being turned into a trapezoidal subject through the perspective relation back to a rectangular subject. Although such solution can correct the tilt through straightening, the picture is edited in the library after being captured in such solution. Therefore, a process of the solution is complicated because there are many steps such as importing and editing the picture, causing that many users often do not know how to perform editing operations and the final effect cannot be achieved in one time and timely. For the user, it is required to perform one operation of photographing and saving and one operation of editing and saving, and thus a lot of steps need to be implemented. That is to say, such solution has poor convenience, is difficult to be grasped by many non-professional users and cannot achieve desired effects.

As can be seen from the above analysis, the above two solutions implemented in a physical or software manner are poor in both convenience and operability, resulting in poor user experience.

SUMMARY

Embodiments of the present disclosure aim to provide a method and an apparatus for correcting a tilt of a subject occurred in photographing, as well as a mobile terminal, so as to at least prevent a rectangular subject from being photographed as a trapezoidal subject due to a photographing angle.

According to an aspect of the embodiments of the present disclosure, there is provided a method for correcting a tilt of a subject occurred in photographing, including:

after it is detected by a mobile terminal that the subject enters a viewfinder interface, identifying a boundary of a profile of the subject to obtain the profile of the subject;

analyzing the profile of the subject to determine whether the subject is tilted; and performing a process for straightening and photographing on the subject to obtain a picture in which the subject is straightened if the subject is determined to be tilted.

In the above described solution, the step of identifying a boundary of a profile of the subject to obtain the profile of the subject includes:

comparing the subject with a background in terms of color and brightness, and identifying the boundary of the profile of the subject in accordance with differences between the subject and the background in terms of color and brightness, so as to obtain the profile of the subject.

In the above described solution, the step of analyzing the profile of the subject to determine whether the subject is tilted includes:

determining whether the subject is photographed as a trapezoidal subject by determining whether the profile of the subject has parallel sides and a total number of the parallel sides is two; and further determining whether the subject is necessary to undergo the process for straightening and photographing if the subject is determined to be photographed as the trapezoidal subject.

In the above described solution, the step of further determining whether the subject is necessary to undergo the process for straightening and photographing if the subject is determined to be photographed as the trapezoidal subject includes:

determining whether the subject is at a center position of the viewfinder interface and whether an area of the subject exceeds a preset percentage of the viewfinder interface; and determining that the trapezoidal subject is necessary to undergo the process for straightening and photographing if the subject is at the center position of the viewfinder interface and the area of the subject exceeds the preset percentage of the viewfinder interface.

In the above described solution, the step of performing a process for straightening and photographing on the subject to obtain a picture in which the subject is straightened if the subject is determined to be tilted includes:

after performing a first operation on the subject which is determined as being necessary to undergo the process for straightening and photographing, obtaining a picture in which the subject is tilted according to a received photographing instruction; and performing a second operation on the picture in which the subject is tilted to obtain the picture in which the subject is straightened.

In the above described solution, the step of performing a first operation on the subject which is determined as being necessary to undergo the process for straightening and photographing includes:

providing auxiliary lines, the auxiliary lines are perpendicular to a longer side in the parallel sides of the profile of the subject, and the auxiliary lines pass through two corner points of the longer side in the parallel sides respectively; and providing arrows, the arrows are directed to the auxiliary lines from two corner points of a shorter side in the parallel sides of the profile of the subject respectively, and are used for indicating movement directions of the two corner points of the shorter side in the parallel sides.

In the above described solution, the step of performing a second operation on the picture in which the subject is tilted to obtain the picture in which the subject is straightened includes:

based on the profile of the subject, separating the subject from the background to obtain an image in which the subject is tilted; and straightening the image in which the subject is tilted according to the arrows for indicating the movement directions of the two corner points of the shorter side in the parallel sides, so as to obtain the picture in which the subject is straightened.

According to another aspect of the embodiments of the present disclosure, there is provided an apparatus for correcting a tilt of a subject occurred in photographing, including:

an identification module, arranged to identify, after it is detected by a mobile terminal that the subject enters a viewfinder interface, a boundary of a profile of the subject to obtain the profile of the subject;

an analysis module, arranged to analyze the profile of the subject to determine whether the subject is tilted; and a straightening module, arranged to perform a process for straightening and photographing on the subject to obtain a picture in which the subject is straightened if the subject is determined to be tilted.

In the above described solution, the analysis module further includes:

a first determination sub-module, arranged to determine whether the subject is photographed as a trapezoidal subject by determining whether the profile of the subject has parallel sides and a total number of the parallel sides is two; and a second determination sub-module, arranged to further determine whether the subject is necessary to undergo the process for straightening and photographing if the subject is determined to be photographed as the trapezoidal subject.

In the above described solution, the straightening module further includes:

a first operation sub-module, arranged to obtain, after performing a first operation on the subject which is determined as being necessary to undergo the process for straightening and photographing, a picture in which the subject is tilted according to a received photographing instruction; and a second operation sub-module, arranged to perform a second operation on the picture in which the subject is tilted, so as to obtain a picture in which the subject is straightened.

An embodiment of the present disclosure provides a computer storage medium storing computer-executable instructions, and the computer-executable instructions are used for executing the previously-described method for correcting a tilt of a subject occurred in photographing.

According to another aspect of the embodiments of the present disclosure, there is provided a mobile terminal, including a camera and a processor, where the processor is arranged to identify, when it is detected by the processor that a subject enters a viewfinder interface of the camera, a boundary of a profile of the subject to obtain the profile of the subject; analyze the profile of the subject to determine whether the subject is tilted; and perform a process for straightening and photographing on the subject to obtain a picture in which the subject is straightened if the subject is determined to be tilted.

Compared with the prior art, the embodiments of the present disclosure have the following advantageous effect: enabling a mobile terminal to correct a tilt of a planar rectangular subject due to a photographing angle by providing a method of building an algorithm program in the mobile terminal.

DETAILED DESCRIPTION

Preferred embodiments of the present disclosure will be described below in detail with reference to accompanying drawings, and it is to be understood that the preferred embodiments described hereinafter are given by way of illustration and explanation only and are not intended to limit the present disclosure.

Figure 1:
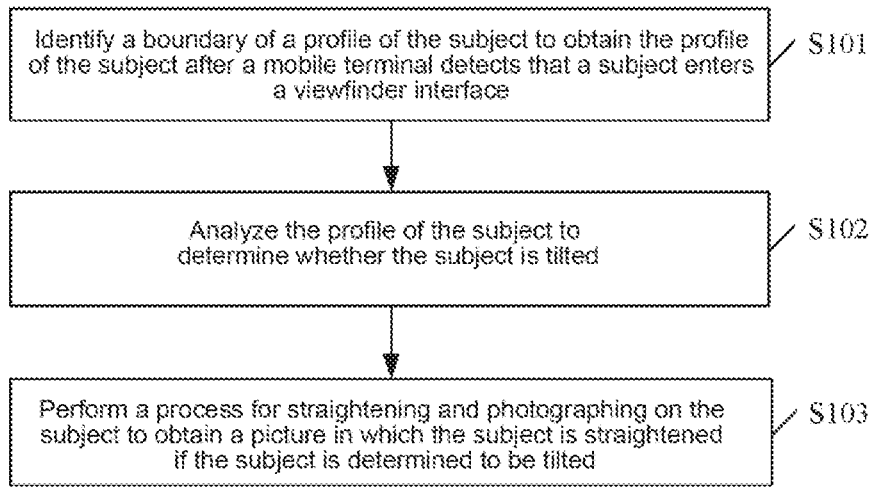
FIG. 1 is a schematic diagram showing a method for correcting a tilt of a subject occurred in photographing according to an embodiment of the present disclosure.

FIG. 1 is a schematic diagram showing a method for correcting a tilt of a subject occurred in photographing according to an embodiment of the present disclosure. As shown in FIG. 1, the method particularly includes steps described below.

In step S101, after a mobile terminal detects that a subject enters a viewfinder interface, a boundary of a profile of the subject is identified to obtain the profile of the subject.

In step S101, the color and brightness of the subject are compared with that of the background to identify the boundary of the profile of the subject, thereby obtaining the profile of the subject. Since the subject and the background are different in aspects of the color, the brightness and the like, the boundary of the profile of the subject may be identified based on such difference, thereby obtaining the profile of the subject.

In step S102, the profile of the subject is analyzed to determine whether the subject is tilted.

In step S102, it is determined whether the subject is photographed as a trapezoidal subject by determining whether the profile of the subject has parallel sides and a total number of parallel sides is two.

It is further determined whether the subject is necessary to undergo a process for straightening and photographing if the subject is determined to be photographed as the trapezoidal subject.

In an embodiment, the step of further determining whether the subject is necessary to undergo a process for straightening and photographing if the subject is determined to be photographed as the trapezoidal subject includes:

determining whether the subject is at a center position of the viewfinder interface and whether the area of the subject exceeds a preset percentage of the viewfinder interface; and determining that the trapezoidal subject is necessary to undergo the process for straightening and photographing if the subject is at the center position of the viewfinder interface and the area of the subject exceeds the preset percentage of the viewfinder interface.

In step S103, if the subject is determined to be tilted, the process for straightening and photographing is performed on the subject to obtain a picture in which the subject is straightened.

Step S103 includes the following steps:

after performing a first operation on the subject which is determined as being necessary to undergo the process for straightening and photographing, obtaining a picture in which the subject is tilted according to a received photographing instruction; and performing a second operation on the picture in which the subject is tilted, so as to obtain the picture in which the subject is straightened.

In an embodiment, the step of performing the first operation on the subject which is determined as being necessary to undergo the process for straightening and photographing includes:

providing auxiliary lines which pass through two corner points of the longer one of the parallel sides of the profile of the subject respectively and are perpendicular to the longer one of the parallel sides; and providing arrows which are directed to the auxiliary lines from two corner points of the shorter one of the parallel sides of the profile of the subject respectively and are used for indicating movement directions of the two corner points of the shorter one of the parallel sides.

In an embodiment, the step of performing the second operation on the picture in which the subject is tilted to obtain the picture in which the subject is straightened includes:

separating, based on the subject profile, the subject from the background to obtain an image in which the subject is tilted; and straightening the image in which the subject is tilted according to the arrows for indicating the movement directions of the two corner points of the shorter one of the parallel sides, so as to obtain the picture in which the subject is straightened.

It will be understood by those ordinarily skilled in the art that all or a part of steps in the method of the embodiment described above may be accomplished by instructing relevant hardware by a program. The program may be stored in a computer-readable storage medium, and includes the following steps when being executed:

(1) after it is detected by a computer-readable storage medium that a subject enters a viewfinder interface, identifying a boundary of a profile of the subject to obtain the profile of the subject;

(2) analyzing the profile of the subject to determine whether the subject is tilted; and (3) performing a process for straightening and photographing on the subject to obtain a picture in which the subject is straightened if the subject is determined to be tilted.

The above computer storage medium for example includes a read only memory (ROM)/a random access memory (RAM), a magnetic disk, an optical disk, and the like.

Figure 2:
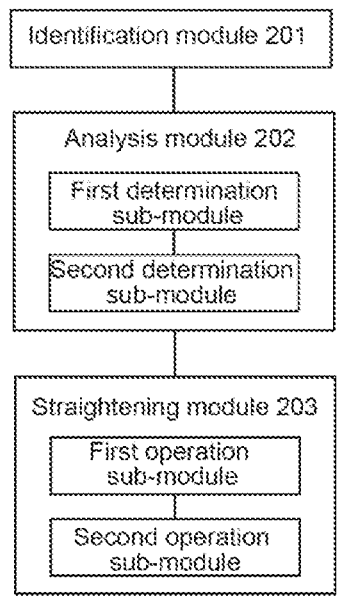
FIG. 2 is a structural diagram showing an apparatus for correcting a tilt of a subject occurred in photographing according to an embodiment of the present disclosure.

FIG. 2 is a structural diagram showing an apparatus for correcting a tilt of a subject occurred in photographing according to an embodiment of the present disclosure. As shown in FIG. 2, the apparatus includes an identification module 201, an analysis module 202, and a straightening module 203.

The identification module 201 is arranged to, after it is detected that a subject enters a viewfinder interface, identify a boundary of a profile of the subject to obtain the profile of the subject.

The analysis module 202 is arranged to analyze the profile of the subject to determine whether the subject is tilted. Specifically, the analysis module 202 includes a first determination sub-module, arranged to determine whether the subject is photographed as a trapezoidal subject by determining whether the profile of the subject has parallel sides and the number of parallel sides is two; and a second determination sub-module, arranged to further determine whether the subject is necessary to undergo a process for straightening and photographing if the subject is determined to be photographed as the trapezoidal subject.

The straightening module 203 is arranged to, if the subject is determined to be tilted, perform the process for straightening and photographing on the subject to obtain a picture in which the subject is straightened. Specifically, the straightening module 203 includes a first operation sub-module, arranged to obtain a picture in which the subject is tilted according to a received photographing instruction after performing a first operation on the subject which is determined as being necessary to undergo the process for straightening and photographing; and a second operation sub-module, arranged to perform a second operation on the picture in which the subject is tilted, so as to obtain the picture in which the subject is straightened.

In the practical application, each of the identification module 201, the analysis module 202, and the straightening module 203 may be implemented by a Central Processing Unit (CPU), a Digital Signal Processor (DSP), or a Micro Processor Unit (MPU), or a Field Programmable Gate Array (FPGA).

Figure 3A:
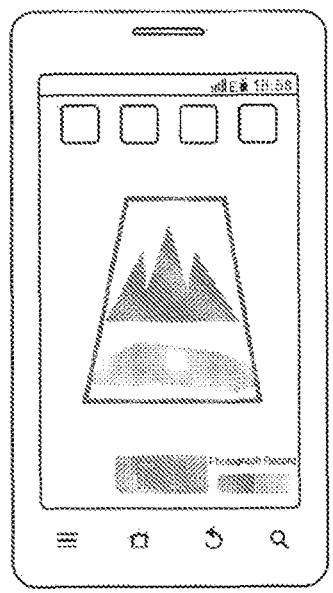
FIG. 3 is a schematic diagram showing a display during a process of correcting a tilt of a subject occurred in photographing according to an embodiment of the present disclosure.

FIG. 3 is a schematic diagram showing a display during a process of correcting a tilt of a subject occurred in photographing according to an embodiment of the present disclosure. As shown in FIG. 3, in a function list of a camera, it is selected whether a function for correcting the tilt by straightening is enabled. If the tilt straightening function is selected to be closed, the tilt straightening function is disabled. If the function is selected to be opened, the function in the function list of the camera of the mobile phone is enabled. Specific implementation steps are as follows:

(1) As shown in FIG. 3(a), after a subject enters a viewfinder interface, a backend identifies a shape of a profile of the subject by detecting differences between a boundary of the profile of the subject and the background in terms of the color, brightness and the like.

Figure 3B:
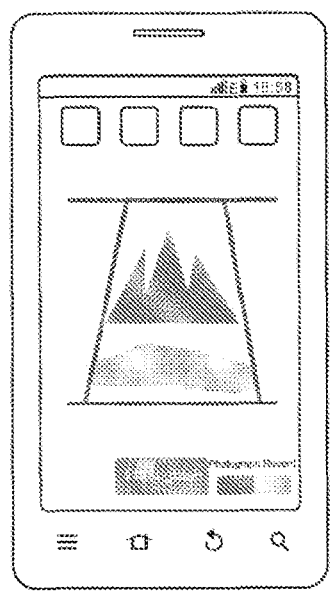

(2) A process corresponding to FIG. 3(b) belongs to a determination of the backend, and will not be displayed on a mobile phone screen. It is determined by the backend whether the subject is trapezoidal by detecting whether the profile of the subject has parallel sides and the number of parallel sides is two.

Figure 3C:
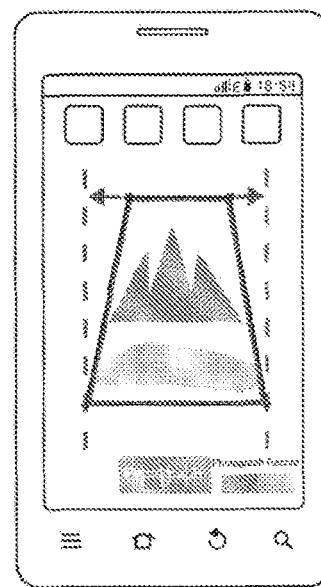

(3) As shown in FIG. 3(c), after the determination, it is determined that the subject is trapezoidal, and it is determined whether preset conditions (position, area) are met. That is, it is determined whether the profile of the subject is at a center region and whether the area exceeds ¼ of the screen. If the preset conditions are not met, the function for correcting the tilt by straightening is suspended. If the preset conditions are met, the followings are performed: sketching out a profile of the trapezoidal subject with corner points and line frames; providing vertical auxiliary lines (as indicated by dashed lines) at two corner points of a longer one of two mutually parallel sides of the trapezoidal subject, where the vertical auxiliary lines are perpendicular to the longer one of the two mutually parallel sides and pass through the two corner points respectively; and indicating corner points to be moved and directions thereof with arrows.

Figure 3D:
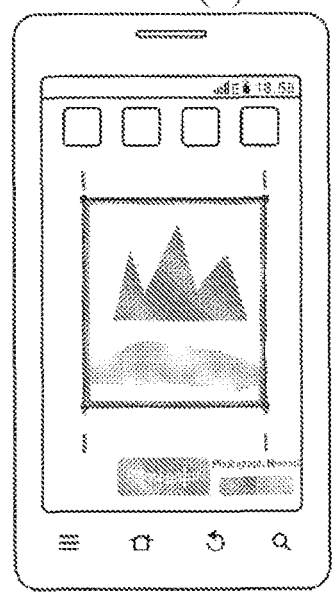

(4) A process corresponding to FIG. 3(d) belongs to a backend processing procedure, and will not be displayed on the screen of the mobile phone. When the user presses a shutter, the mobile phone photographs the subject in a viewfinder frame, and the following operations are executed by the backend: identifying the profile according to the detected trapezoidal subject; separating the subject from the background; according to the auxiliary lines, horizontally or vertically stretching each of the two corner points of a shorter one of the two mutually parallel sides respectively to the vertical auxiliary line mostly approaching the corner point. Similar to a morphing tool function in a picture processing tool such as Photoshop (PS,) an image of the trapezoidal subject in the picture changes as the corner points are stretched.

Figure 3E:
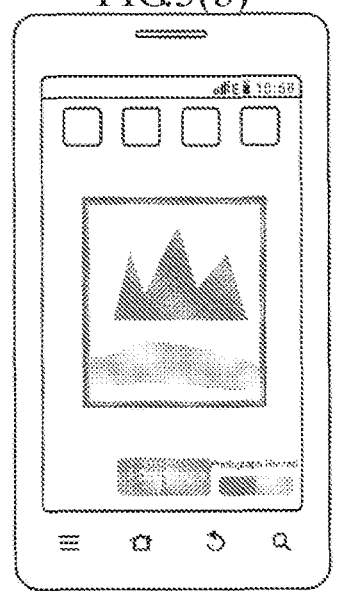

(5) A process corresponding to FIG. 3(e) belongs to the backend processing procedure, and will not be displayed on the screen of the mobile phone. After a stretched rectangular subject is obtained, only the stretched rectangular subject is selected by cropping, and irrelevant parts around the stretched rectangular subject are deleted. In fact, since the subject is substantively taken as a center when such planar rectangular object is photographed, the parts outside the subject can be substantively ignored, and the object being photographed as trapezoidal object due to the photographing angle is modified and corrected.

Figure 3F:
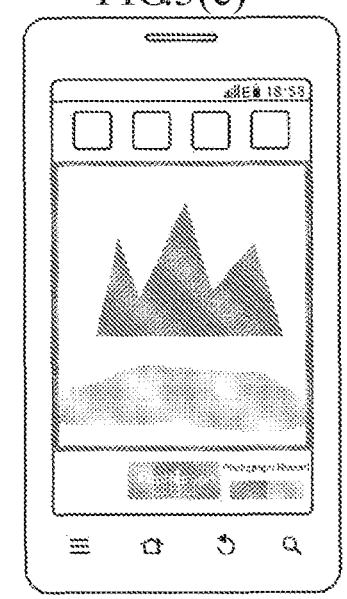

(6) As shown in FIG. 3(f), a picture subjected to a process for correcting the tilt by straightening and subjected to cropping is presented and stored, in such picture, the subject is straightened.

Figure 4:
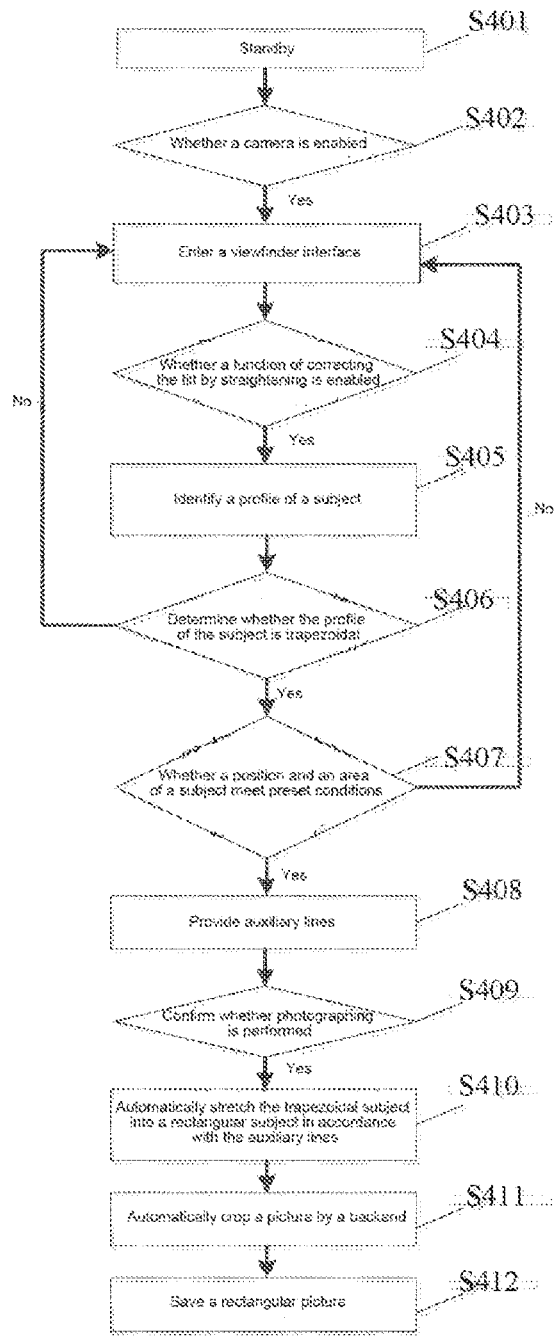
FIG. 4 illustrates a workflow of correcting a tilt of a subject occurred in photographing according to an embodiment of the present disclosure.
Figure 4:
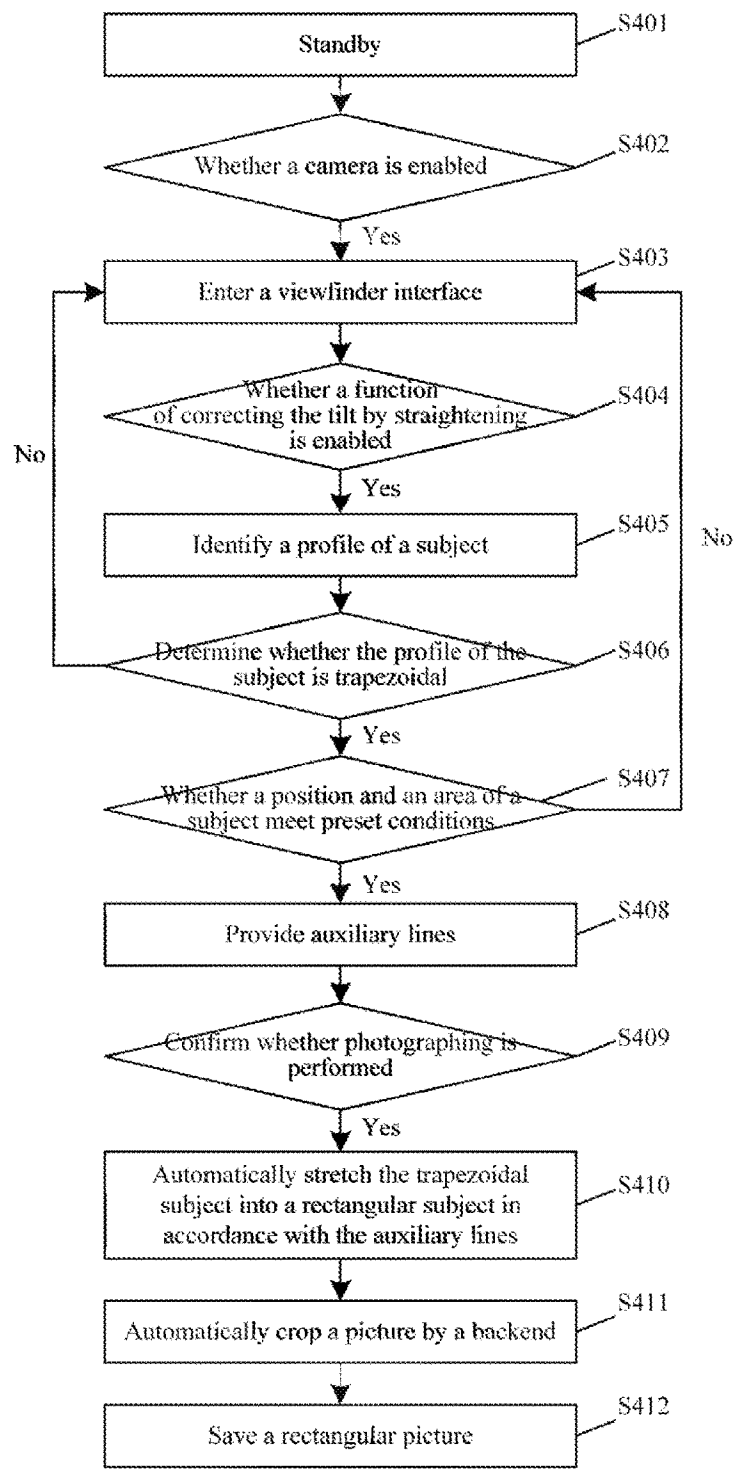

FIG. 4 illustrates a workflow of correcting a tilt of a subject occurred in photographing according to an embodiment of the present disclosure. As shown in FIG. 4, the function for correcting the tilt by straightening has a function switch option in the camera application of the mobile phone. The user can set the function switch option to control the close or open of such function in the camera application. A specific workflow is as follows:

In step S401, a mobile phone is currently in a standby mode.

In step S402, it is determined whether a camera is enabled to perform photographing.

In step S403, when it is determined that the camera has been enabled, a viewfinder interface is presented. The viewfinder interface refers to an interface displayed on the display screen of the mobile phone after the camera application is enabled.

In step S404, it is determined whether the function for correcting the tilt by straightening is enabled.

In step S405, when it is determined that the tilting straightening function is enabled, viewfinder focusing is performed, the backend identifies the shape of the profile of the subject by detecting and analyzing differences between the boundary of the profile of the subject and the background in terms of the color, color gradation, brightness and the like.

In step S406, it is detected whether the profile of the subject has parallel sides and the number of parallel sides is two, so as to determine whether the profile of the subject is trapezoidal. If the profile of the subject is not trapezoidal, the workflow returns to step S403.

If the profile of the subject is trapezoidal, it is determined in step S407 whether the position and the area of the profile of the subject meet the preset conditions. If the position and the area fail to meet the preset conditions, the workflow returns to step S403. The preset conditions may be set as follows: the subject is at the center position, and the area thereof exceeds more than 25% of the screen.

When the position and the area meet the preset conditions, the following operations are executed in step S408: presenting corner points and line frames for sketching the profile of the subject in a viewing frame; sketching out the subject with the line frames; providing vertical auxiliary lines at corner points of the longer one of two mutually parallel sides of the subject, where the vertical auxiliary lines are perpendicular to the longer one of two mutually parallel sides and pass through the corner points; and indicating corner points to be moved and directions thereof with arrows.

In step S409, it is determined whether the photographing is confirmed.

In step S410, the trapezoidal subject is automatically stretched into a rectangular subject according to the auxiliary lines, thereby obtaining an effect similar to that of a picture stretching tool in PS. After the mobile phone photographs the subject in the viewing frame, the following operations are executed by the backend: identifying the profile according to the detected trapezoidal subject; separating the subject from the background; according to the auxiliary lines, horizontally or vertically stretching each of two corner points of the shorter one in the two mutually parallel sides to the vertical auxiliary line mostly approaching the corner point. The image of the trapezoidal subject changes as the corner points are stretched, which is similar to a morphing tool function in a picture processing tool such as the PS.

In step S411, the picture is cropped by the backend automatically and only the rectangular region is retained. After the picture is cropped by the backend, only the stretched rectangular object is retained.

In step S412, the picture is saved. The rectangular subject is presented and saved, so as to achieve a user-desired unique photographic effect required by similar re-photographing and scanning of the planar rectangular object, and enhance the user experience of photographing objects such as paintings and calligraphy works, posters and documents.

To sum up, the embodiments of the present disclosure have the following technical effect: through providing a method of building an algorithm program in a mobile terminal, the mobile terminal is enabled to correct a tilt of the planar rectangular subject caused by a photographing angle in photographing. Therefore, a technical superimposed synthesis customized for the user is achieved, so that the user can edit the tilted object to be photographed when viewing, the object may be presented as soon as it is photographed, and a post-editing is eliminated. Meanwhile, determination regarding the position and the area is added in a process of identifying the profile of the subject, which avoids the interference of a secondary subject, and greatly improves the accuracy, so that the user feels that the camera is more convenient and more humanized and provides excellent photographing experience to the user.

It will be understood by those skilled in the art that implementation functions of the modules in the apparatus for correcting a tilt of a subject occurred in photographing as shown in FIG. 2 may be understood by referring to the relevant description regarding the method for correcting the tilt of the subject in photographing. It will be understood by those skilled in the art that functions of processing units in the apparatus for correcting the tilt of the subject in photographing as shown in FIG. 2 may be implemented by means of a program running on the processor or by means of a specific logical circuit.

Although the present disclosure has been described in detail above, the present disclosure is not limited thereto, and various modifications may be made by those skilled in the art in accordance with the principle of the present disclosure. Accordingly, modifications made in accordance with the principle of the present disclosure are to be understood as falling within the protective scope of the present disclosure.

It will be appreciated by those skilled in the art that embodiments of the present disclosure may be provided as a method, a system, or a computer program product. Thus, the present disclosure may take a form of a hardware embodiment, a software embodiment, or a combination of software and hardware. Moreover, the present disclosure may take a form of a computer program product implemented on one or more computer usable storage media (including but not limited to a magnetic disk memory and an optical memory, and the like) containing a computer usable program code.

The present disclosure has been described with reference to a flow diagram and/or a block diagram of a method, a device (system), and a computer program product according to an embodiment of the present disclosure. It will be appreciated that each process and/or block in the flow diagram and/or block diagram as well as a combination of processes and/or blocks in the flow diagram and/or block diagram may be implemented by a computer program instruction. These computer program instructions may be provided to a processor of a general purpose computer, a special-purpose computer, an embedded processor, or other programmable data processing devices to produce a machine, which causes instructions executed by a processor of a computer or other programmable data processing devices to produce an apparatus for implementing functions specified in one process or more processes of a flow diagram and/or one block or more blocks of a block diagram.

These computer program instructions may also be stored in a computer readable memory capable of directing a computer or other programmable data processing devices to work in a particular manner, such that instructions stored in the computer readable memory produce an article of manufacture that includes an instruction means, and the instruction means implements functions specified in one process or more processes of a flow diagram and/or one block or more blocks of a block diagram.

These computer program instructions may also be loaded onto a computer or other programmable data processing devices such that a series of operational steps are performed on the computer or other programmable devices to produce computer-implemented processing, and thus instructions executed on the computer or other programmable devices provide steps for implementing functions specified in one process or more processes of a flow diagram and/or in one block or more blocks of a block diagram.

The foregoing is intended only as preferred embodiments of the present disclosure and is not intended to limit the protective scope of the present disclosure.

What is claimed is:

1. A method for correcting a tilt of a subject occurred in photographing, comprising:
   in response to detecting, by a mobile terminal, the subject entering a viewfinder interface displayed on the mobile terminal, identifying a boundary of a profile of the subject to obtain the profile of the subject;
   analyzing the profile of the subject to determine whether the subject is tilted; and
   performing straightening and photographing on the subject to obtain a picture in which the subject is straightened in response to determining that the subject is tilted, wherein the performing comprises:
      after performing a first operation on the subject in response to determining to perform straightening and photographing, obtaining a picture in which the subject is tilted according to a received photographing instruction; and
      performing a second operation on the picture in which the subject is tilted to obtain the picture in which the subject is straightened;
   wherein performing the first operation on the subject in response to determining to perform straightening and photographing comprises:
   providing auxiliary lines, wherein the auxiliary lines are perpendicular to a longer side in the parallel sides of the profile of the subject, and the auxiliary lines pass through two corner points of the longer side in the parallel sides respectively; and
   providing arrows, wherein the arrows are directed to the auxiliary lines from two corner points of a shorter side in the parallel sides of the profile of the subject respectively, and are indicative of movement directions of the two corner points of the shorter side in the parallel sides.

2. The method according to claim 1, wherein identifying the boundary of the profile of the subject to obtain the profile of the subject comprises:
   comparing the subject with a background based on color and brightness, and identifying the boundary of the profile of the subject in accordance with differences between the subject and the background based on color and brightness and obtaining the profile of the subject.

3. The method according to claim 2, wherein analyzing the profile of the subject to determine whether the subject is tilted comprises:
   determining whether the subject is photographed as a trapezoidal subject by determining whether the profile of the subject includes parallel sides and determining that a total number of the parallel sides is two; and
   further determining whether to perform straightening and photographing in response to determining that the subject is photographed as the trapezoidal subject.

4. The method according to claim 3, wherein further determining whether to perform straightening and photographing in response to determining that the subject is photographed as the trapezoidal subject comprises:

determining whether the subject is at a center position of the viewfinder interface and whether an area of the subject exceeds a preset percentage of the viewfinder interface; and determining to perform straightening and photographing on the trapezoidal subject in response to determining that the subject is at the center position of the viewfinder interface and the area of the subject exceeds the preset percentage of the viewfinder interface.

5. The method according to claim 1, wherein performing the second operation on the picture in which the subject is tilted to obtain the picture in which the subject is straightened comprises:

based on the profile of the subject, separating the subject from the background to obtain an image in which the subject is tilted; and straightening the image in which the subject is tilted according to the arrows indicative of the movement directions of the two corner points of the shorter side in the parallel sides and obtaining the picture in which the subject is straightened.

6. An apparatus for correcting a tilt of a subject occurred in photographing, comprising a processor configured to:

identify, in response to detecting, by a mobile terminal, the subject entering a viewfinder interface displayed on the mobile terminal, a boundary of a profile of the subject to obtain the profile of the subject;

analyze the profile of the subject to determine whether the subject is tilted; and perform straightening and photographing on the subject to obtain a picture in which the subject is straightened in response to determining that the subject is tilted;

obtain, after performing a first operation on the subject in response to determining to perform straightening and photographing, a picture in which the subject is tilted according to a received photographing instruction; and perform a second operation on the picture in which the subject is tilted and obtain the picture in which the subject is straightened;

wherein the processor is configured to perform the first operation on the subject in response to determining to perform straightening and photographing by:

providing auxiliary lines, wherein the auxiliary lines are perpendicular to a longer side in the parallel sides of the profile of the subject, and the auxiliary lines pass through two corner points of the longer side in the parallel sides respectively; and providing arrows, wherein the arrows are directed to the auxiliary lines from two corner points of a shorter side in the parallel sides of the profile of the subject respectively, and are indicative of movement directions of the two corner points of the shorter side in the parallel sides.

7. The apparatus according to claim 6, wherein the processor is further configured to:

determine whether the subject is photographed as a trapezoidal subject by determining whether the profile of the subject includes parallel sides and determining that a total number of the parallel sides is two; and further determine whether to perform straightening and photographing in response to determining that the subject is photographed as the trapezoidal subject.

8. A mobile terminal, comprising a camera and a processor, wherein the processor is configured to: identify, in response to detecting, by the processor, a subject entering a viewfinder interface of the camera, a boundary of a profile of the subject to obtain the profile of the subject; to analyze the profile of the subject to determine whether the subject is tilted; perform straightening and photographing on the subject to obtain a picture in which the subject is straightened in response to determining that the subject is tilted; obtain, after performing a first operation on the subject in response to determining to perform straightening and photographing, a picture in which the subject is tilted according to a received photographing instruction; and perform a second operation on the picture in which the subject is tilted and obtain the picture in which the subject is straightened;

wherein the processor is further configured to perform the first operation on the subject in response to determining to perform straightening and photographing by:

providing auxiliary lines, wherein the auxiliary lines are perpendicular to a longer side in the parallel sides of the profile of the subject, and the auxiliary lines pass through two corner points of the longer side in the parallel sides respectively; and providing arrows, wherein the arrows are directed to the auxiliary lines from two corner points of a shorter side in the parallel sides of the profile of the subject respectively, and are indicative of movement directions of the two corner points of the shorter side in the parallel sides.

9. A non-transitory computer storage medium storing a plurality of computer-executable instructions, wherein the plurality of computer-executable instructions are used for executing the method according to claim 1.

10. The non-transitory computer storage medium according to claim 9, wherein identifying the boundary of the profile of the subject to obtain the profile of the subject comprises:

comparing the subject with a background based on color and brightness, and identifying the boundary of the profile of the subject in accordance with differences between the subject and the background based on color and brightness and obtaining the profile of the subject.

11. The non-transitory computer storage medium according to claim 10, wherein analyzing the profile of the subject to determine whether the subject is tilted comprises:

determining whether the subject is photographed as a trapezoidal subject by determining whether the profile of the subject includes parallel sides and determining that a total number of the parallel sides as two; and further determining whether to perform straightening and photographing in response to determining that the subject is photographed as the trapezoidal subject.

12. The non-transitory computer storage medium according to claim 11, wherein further determining whether to perform straightening and photographing in response to determining that the subject is photographed as the trapezoidal subject comprises:

determining whether the subject is at a center position of the viewfinder interface and whether an area of the subject exceeds a preset percentage of the viewfinder interface; and determining to perform straightening and photographing on the trapezoidal subject in response to determining that the subject is at the center position of the viewfinder interface and the area of the subject exceeds the preset percentage of the viewfinder interface.

13. The non-transitory computer storage medium according to claim 9, wherein performing the second operation on the picture in which the subject is tilted to obtain the picture in which the subject is straightened comprises:
   based on the profile of the subject, separating the subject from the background to obtain an image in which the subject is tilted; and
   straightening the image in which the subject is tilted according to the arrows indicative of the movement directions of the two corner points of the shorter side in the parallel sides and obtaining the picture in which the subject is straightened.

* * * * *

UNITED STATES PATENT AND TRADEMARK OFFICE
CERTIFICATE OF CORRECTION

PATENT NO. : 10,313,596 B2  
APPLICATION NO. : 15/538502  
DATED : June 4, 2019  
INVENTOR(S) : Yu Zhang Page 1 of 2

It is certified that error appears in the above-identified patent and that said Letters Patent is hereby corrected as shown below:

On the Title Page

Item (54) Title, at Line 3, change "*OCUURED*" *to* --OCCURRED--.

In the Drawings

Regarding FIG. 4, a Replacement Sheet is attached.

In the Specification

In Column 1 at Line 3, change "*OCUURED*" *to* --OCCURRED--.

Signed and Sealed this
Twenty-sixth Day of November, 2019

Andrei Iancu
*Director of the United States Patent and Trademark Office*